United States Patent [19]

Gellert

[11] Patent Number: 4,923,387
[45] Date of Patent: May 8, 1990

[54] INJECTION MOLDING SYSTEM HAVING A VALVE MEMBER WITH A RIBBED INSULATIVE PORTION

[76] Inventor: Jobst U. Gellert, 7A Prince Street, Georgetown, Ontario, Canada, L7G 2X1

[21] Appl. No.: 315,487

[22] Filed: Feb. 27, 1989

[30] Foreign Application Priority Data

Feb. 14, 1989 [CA] Canada .................................. 591009

[51] Int. Cl.⁵ ............................................. B29C 45/23
[52] U.S. Cl. .................................. 425/549; 264/328.9; 264/328.15; 425/562; 425/564; 425/566; 425/568; 425/570
[58] Field of Search ............... 425/552, 549, 562, 563, 425/564, 565, 566, 568, 570, 571, 573, 557; 264/328.8, 328.9, 328.15

[56] References Cited

U.S. PATENT DOCUMENTS

| | | | |
|---|---|---|---|
| 4,521,179 | 6/1985 | Gellert | 425/566 |
| 4,657,496 | 4/1987 | Ozeki et al. | 425/562 |
| 4,712,995 | 12/1987 | Basnett | 425/562 |
| 4,717,324 | 1/1988 | Schad et al. | 425/562 |
| 4,740,151 | 4/1988 | Schmidt et al. | 425/562 |

Primary Examiner—Jay H. Woo
Assistant Examiner—Timothy W. Heitbrink
Attorney, Agent, or Firm—Riches, McKenzie & Herbert

[57] ABSTRACT

A valve gated injection molding system having a novel valve member for large volume applications. The elongated valve member has a ribbed insulative portion between the main steel portion and a conductive portion adajcent the tip end. The conductive portion provides more rapid cooling when the tip end is seated in the gate in the closed position. The adjacent insulative portion provides a thermal barrier to reduce heat flow along the valve member to the conductive portion. This combination avoids sticking of the tip end when the mold opens and thus allows cycle time to be reduced. The conductive portion has an integral beryllium copper plug which is supported by radially extending ribs of the insulative portion to withstand continual repeated impact loading every time the gate is closed.

4 Claims, 3 Drawing Sheets

INJECTION MOLDING SYSTEM HAVING A VALVE MEMBER WITH A RIBBED INSULATIVE PORTION

BACKGROUND OF THE INVENTION

This invention relates generally to injection molding and more particularly to a valve gated system having a valve member having a conductive portion at the forward tip end supported by a ribbed insulative portion.

There is an increasing demand for large volume hot runner injection molding systems. This requires large gates and correspondingly large diameter valve members or pins. The problem with large diameter valve members has been that they stick because they conduct too much heat forwardly to the gate. Consequently, the molding cycle has to be slowed down to allow more time for cooling which reduces efficiency and still often leaves unsightly gate marks.

The use of insulative air spaces is well known in the injection molding field. For instance, insulative air spaces are normally provided between a heated nozzle and the surrounding cooled cavity plate. Furthermore, the use of an air space adjacent a conductive plug in a valve pin is disclosed in the applicant's U.S. Pat. No. 4,521,179 which issued June 4, 1985 relating to core ring gate molding. However, in that application there is no concern or requirement for high structural strength because the valve member or pin is not subject to continual impacting when it closes.

SUMMARY OF THE INVENTION

Accordingly, it is an object of the invention to at least partially overcome the problems of the prior art by a valve pin construction with an insulative portion which provides additional structural strength to the conductive portion.

To this end, in one of its aspects, the invention provides a valve gated hot runner injection molding system having a heated nozzle seated in a well in a cavity plate, the nozzle having a central bore extending therethrough to receive an elongated valve member with a forward tip end and a rear end and to provide a melt passage which extends in the central bore around at least a forward portion of the valve member to convey melt to a gate extending through the cavity plate to a cavity, and valve member actuating means to reciprocate the valve member longitudinally between a retracted open position and a forward closed position in which the tip end of the valve member is seated in the gate, the improvement wherein the valve member comprises an integral insulative portion between a relatively long steel main portion extending from the rear end and a relatively short conductive portion adjacent the forward tip end, the conductive portion including a highly conductive metal, the insulative portion including at least one longitudinal rib positioned to support the conductive metal of the conductive portion.

Further objects and advantages of the invention will appear from the following description, taken together with the accompanying drawings.

DETAILED DESCRIPTION OF THE DRAWINGS

Figure 1:
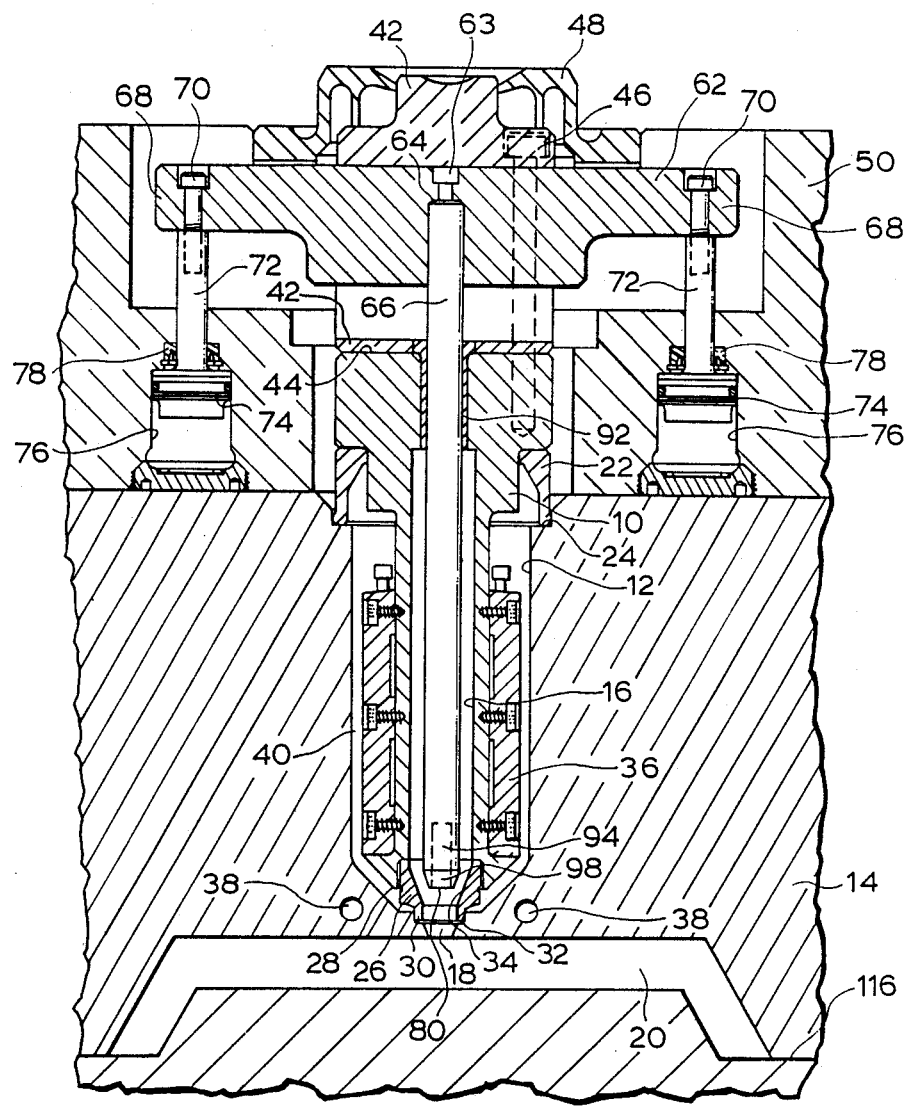
FIG. 1 is a sectional view of a portion of an injection molding system according to a preferred embodiment of the invention.

Reference is first made to FIG. 1 which shows a nozzle 10 seated in a well 12 in a cavity plate 14. The nozzle 10 has a central bore 16 which is aligned with a gate 18 which extends through the cavity plate 14 to a cavity 20. The nozzle 10 is accurately located in this position by an insulating flange 22 which seats against a circumferential shoulder 24 and by a nozzle seal insert 26. The nozzle seal insert 26 which is screwed into the forward end 28 of the nozzle 10 has a cylindrical nose portion 30 which is received in a seat 32 around the gate 18 and a tapered bore 34 which is in alignment with and extends from the central bore 16 of the nozzle 10 to the gate 18. Electric plate heaters 36 as described in the applicant's Canadian patent application serial No. 589,738 filed Feb. 1, 1989 entitled "Profiled Plate Heaters for Injection Molding Nozzles" are located on opposite sides of the nozzle 10 to heat the nozzle. The cavity plate 14 is cooled by pumping cooling water through conduits 38 and an insulative air space 40 is provided between the heated nozzle 10 and the surrounding cooled cavity plate 14.

Figure 2:
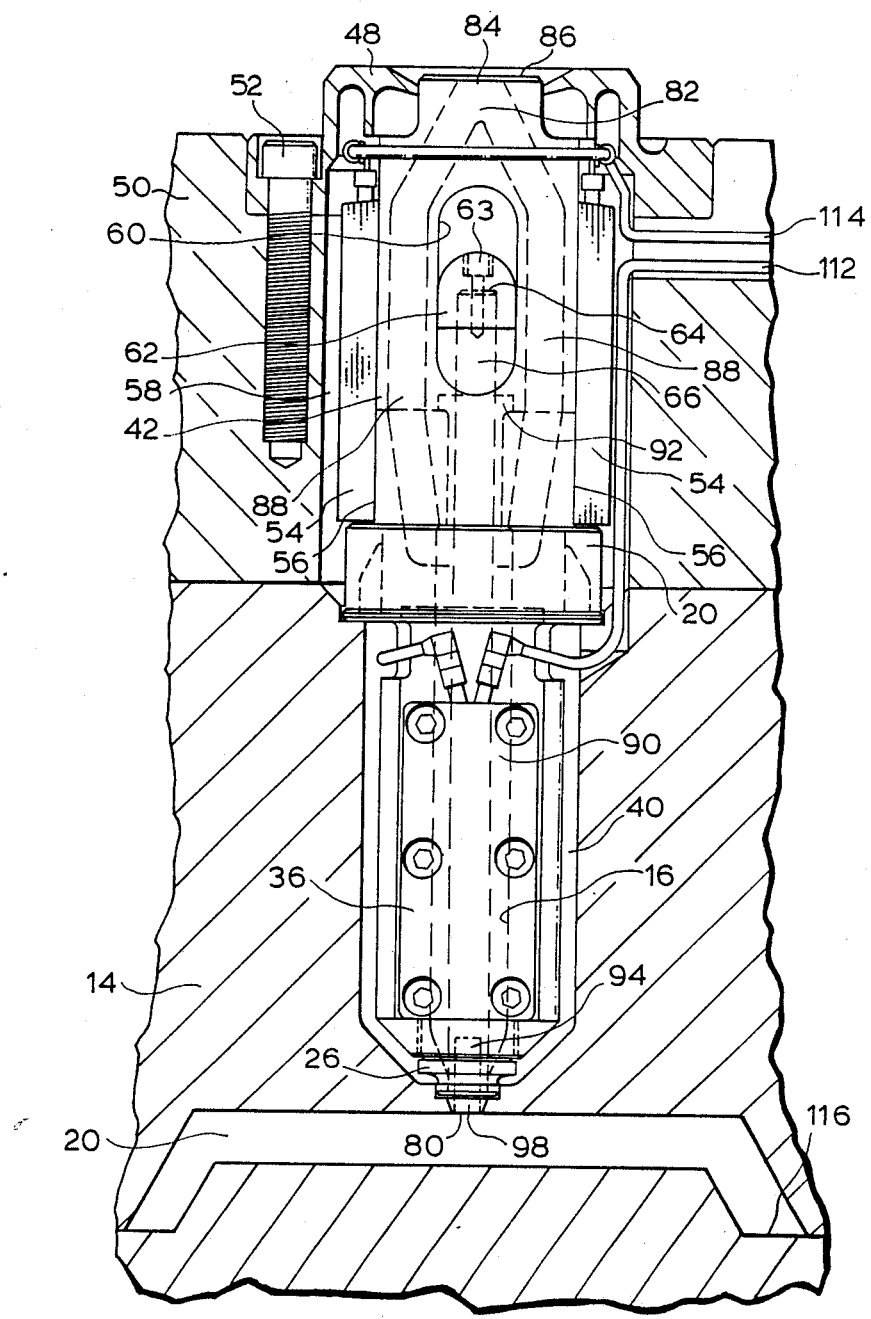
FIG. 2 is a sectional view of the same system at a right angle to FIG. 1.

A manifold 42 is secured to the rear end 44 of the nozzle 10 by bolts 46. The manifold 42 and the nozzle 10 are held in place by a locating collar 48 which is fastened to the back plate 50 by bolts 52. The back plate 50 is, in turn, mounted to the cavity plate 14 by bolts which are not shown. As seen in FIG. 2, the manifold 42 is heated by electric plate heaters 54 attached to opposite sides 56. The heated manifold 42 is thermally separated from the surrounding cooled back plate 50 by an insulative air space 58, with only minimum contact with the locating collar 48.

The manifold 42 has a transverse opening 60 which is large enough to receive a movable actuating yoke 62 therethrough. The yoke 62 is fastened by screw 63 to the rear end 64 of an elongated valve member 66 which is received in the central bore 16 of the nozzle 10. The outer ends 68 of the yoke 62 are each connected by a screw 70 to a rod 72 extending from a hydraulically actuated piston 74 in a cylinder 76 seated in the back plate 50. A high pressure seal 78 extends around each piston rod 72 to prevent leakage. The pair of pistons 74 are activated in unison according to a predetermined cycle to reciprocate the yoke 62 and the valve member 66 between the retracted open position shown in FIG. 1 and the forward enclosed position shown in FIG. 2 in which the forward tip end 80 of the valve member is seated in the gate 18.

As seen in FIG. 2, a melt passage 82 extends to convey pressurized melt from a central inlet 84 at the rear end 86 of the manifold 42 to the gate 18. The passage 82 splits into two branches 88 which extend around the opening 60 through the manifold 42 in which the yoke 62 reciprocates and join a space 90 in the central bore 16 around the valve member 66. When the valve member 66 is in the retracted open position, the melt then flows through the gate 18 to fill cavity 20. A sealing sleeve 92 is seated around the valve member 66 in the central bore 16 at the rear end 44 of the nozzle 10 to prevent leakage of the pressurized melt from the space 90 as the valve member 66 reciprocates.

Figure 3:
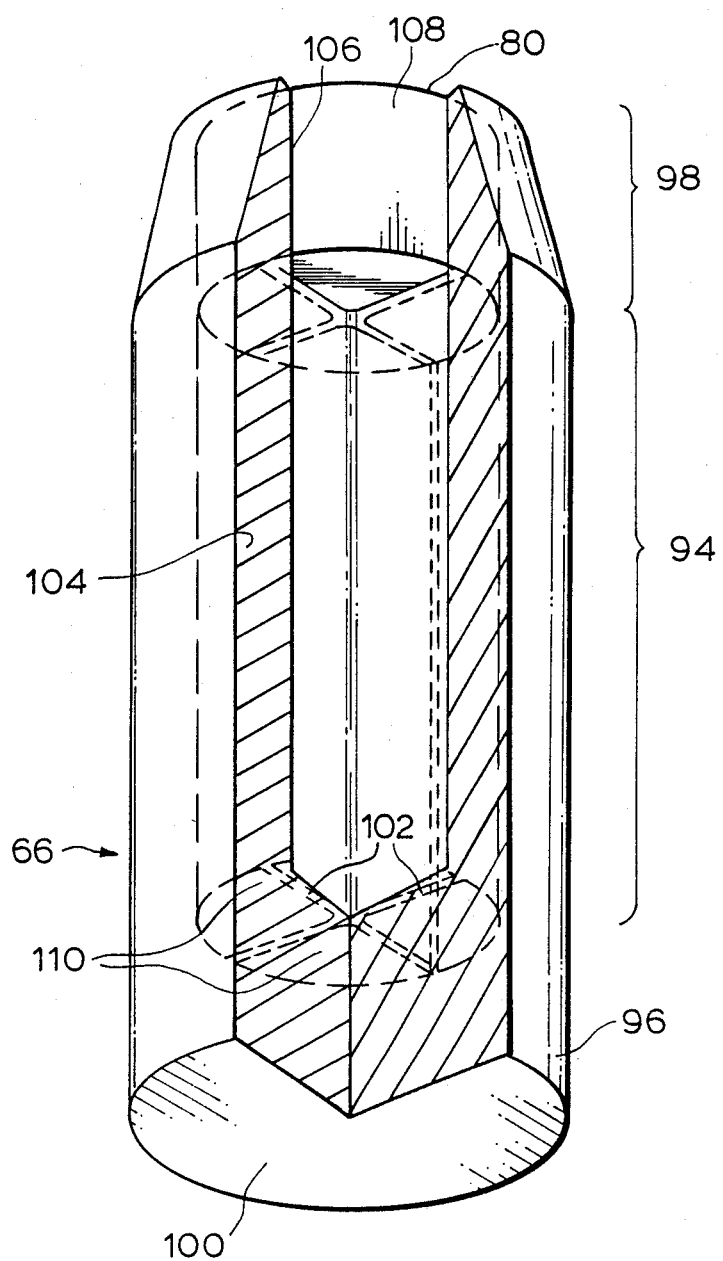
FIG. 3 is a cut-away isometric view of part of the valve member showing the ribbed insulative portion.

The valve member 66 has an integral insulative portion 94 extending between a relatively long main portion 96 which extends from the rear end 64 and a relatively short conductive portion 98 adjacent the forward tip end 80. As seen in FIG. 3, the valve member 66 is made from a steel rod 100 which is machined from the forward end 80 to form a number of radially extending longitudinal ribs 102 surrounded by an outer sleeve portion 104. As seen, the outer sleeve portion 104 extends to the forward end 80 to form a central seat 106 between the ribs 102 and the forward end 80. A cylindrical plug 108 of beryllium copper alloy is then integrally brazed or welded in place in the seat 106 to form the forward tip end 80 of the valve member 66. Thus, the insulative portion 94 has a number of insulative air spaces 110 between the outer sleeve portion 104 and the ribs 102, but the ribs 102 provide structural support for the relatively weak beryllium cope portion 108 to withstand the continually repeated impact forces when it closes. This is particularly critical for large volume applications wherein relatively large diameter valve members are required.

In use, the system is assembled as shown and electrical power is applied to the leads 112,114 to the plate heaters 36,54 to heat the nozzle 10 and the manifold 42 to a predetermined operating temperature. Pressurized melt from a molding machine (not shown) is injected into the melt passage 82 through the central inlet 84 according to a predetermined cycle. Hydraulic pressure to the cylinders 76 is also controlled according to the cycle to position the valve member 66 in the retracted open position when the injection melt pressure is applied. The melt flows through the space 90 around each valve member 66 and through the gate 18 to fill the cavity 20. Injection pressure is then held momentarily to pack and then the pistons 74 drive the yoke 62 and the valve member 66 to the forward closed position in which the tip end 80 of the valve member 66 is seated in the gate 18. Injection pressure is then released and after a short cooling period, the mold is opened along the parting line 116 to eject the molded product After ejection, the mold is closed and hydraulic pressure is reapplied to the cylinders 76 to withdraw the valve members 66 to the open position and injection pressure is reapplied to refill the cavities 20. This cycle is repeated continuously with a frequency dependent upon the size of cavity and type of material being molded. Each time the valve member 66 is driven forward to the closed position there is an impact load on the forward tip end 80. The configuration of the insulative portion 94 of the valve member 66 provides the ribs 102 which support the beryllium copper plug 108 to prevent it failing under this continual impact loading. The air spaces 110 between the ribs 102 provide a thermal barrier to heat transfer along the valve member 66 from the main portion 96 to the conductive portion 98 at the tip end 80.

Also, the conductive portion 98 provides for more rapid cooling of the conductive portion when it contacts the gate 18 in the cooled cavity plate 14 in the forward closed position. This combination of the insulative portion 94 and the conductive portion 98 results in a more rapid decrease in temperature of the tip end 80 which in turn reduces sticking when the mold opens. This allows the cycle time to be reduced, without an unacceptable loss in structual strength of the valve member 66.

While the description of the injection molding system with a valve member having a ribbed insualtive portion 94 and a conductive portion 98 adjacent the tip end 80 has been given with respect to a preferred embodiment, it is not to be construed in a limiting sense. Variations and modifications will occur to those skilled in the art. For instance, it is apparent the insulative portion 94 can have a different number of ribs 102 and that the configuration and dimensions can be changed. Reference is made to the appended claims for a definition of the invention.

What I claim is:

1. In a valve gated hot runner injection molding system having a heated nozzle seated in a well in a cavity plate, the nozzle having a central bore extending therethrough to receive an elongated valve member and to provide a melt passage which extends in the central bore around at least a forward portion of the valve member to convey melt to a gate extending through the cavity plate to a cavity, the elongated valve member having a forward tip end and a rear end and valve member actuating means to reciprocate the valve member longitudinally between a retracted open position and a forward closed position in which the tip end of the valve member is seated in the gate, the improvement wherein;

the valve member comprises an integral insulative portion between a long steel main portion extending from the rear end and a short conductive portion adjacent the forward tip end, the conductive portion including a conductive metal, the insulative portion including at least one longitudinal rib positioned to support the conductive metal of the conductive portion.

2. An injection molding system as claimed in claim 1 wherein the insulative portion of the valve member comprises a cylindrical hollow outer sleeve portion and a plurality of ribs extending radially inward from the outer sleeve portion.

3. An injection molding system as claimed in claim 2 wherein the outer sleeve portion extends to the tip end to form a seat between the ribs and the tip end, and a plug of conductive material is received in the seat to form the conductive portion.

4. An injection molding system as claimed in claim 3 wherein the conductive material is berylluim copper.

* * * * *